(12) United States Patent  (10) Patent No.: US 7,042,724 B2
Löcker  (45) Date of Patent: May 9, 2006

(54) COOLED COMPUTER CASING DISPLAY FRAME

(75) Inventor: Jury Peter Löcker, Langkampfen (AT)

(73) Assignee: Contec Steuerungstechnik und Automation Gesellschaft m.b.H., Waldeck (AT)

(*) Notice: Subject to any disclaimer, the term of this patent is extended or adjusted under 35 U.S.C. 154(b) by 0 days.

(21) Appl. No.: 10/716,416

(22) Filed: Nov. 20, 2003

(65) Prior Publication Data

US 2004/0100766 A1 May 27, 2004

(30) Foreign Application Priority Data

Nov. 22, 2002 (AT) .............................. A 1753/2002

(51) Int. Cl.
G06F 1/16 (2006.01)
(52) U.S. Cl. .................. 361/699; 361/690; 165/104.33
(58) Field of Classification Search ................ 361/681, 361/683–689, 699, 701–704; 165/41, 80.3, 165/104.33, 185; 174/15.1
See application file for complete search history.

(56) References Cited

U.S. PATENT DOCUMENTS

| 5,170,195 | A | * | 12/1992 | Akiyama et al. ............. 353/54 |
| 5,606,341 | A | * | 2/1997 | Aguilera ....................... 345/87 |
| 5,757,615 | A | * | 5/1998 | Donahoe et al. ............. 361/687 |
| 5,796,581 | A |   | 8/1998 | Mok |
| 5,946,187 | A |   | 8/1999 | Cipolla |
| 5,956,383 | A |   | 9/1999 | Kendall |
| 6,055,156 | A | * | 4/2000 | von Gutfeld ................. 361/690 |
| 6,069,791 | A | * | 5/2000 | Goto et al. .................. 361/687 |
| 6,250,378 | B1 | * | 6/2001 | Kobayashi ............. 165/104.33 |
| 6,256,083 | B1 | * | 7/2001 | Numata et al. ............. 349/161 |
| D454,565 | S | * | 3/2002 | Harriman .................... D14/374 |
| 6,530,420 | B1 | * | 3/2003 | Takada et al. ......... 165/104.33 |
| 6,674,642 | B1 | * | 1/2004 | Chu et al. .................... 361/687 |
| 2002/0067591 | A1 | * | 6/2002 | Tajima ........................ 361/681 |
| 2002/0075642 | A1 |   | 6/2002 | Nagashima et al. |
| 2002/0089971 | A1 |   | 7/2002 | Shih |
| 2002/0172005 | A1 |   | 11/2002 | Ford et al. |
| 2004/0080908 | A1 | * | 4/2004 | Wang et al. ................. 361/687 |

FOREIGN PATENT DOCUMENTS

| DE | 299 08 671 U1 | 9/1999 |
| DE | 100 58 739 A1 | 8/2002 |
| JP | 6-204674 | 7/1994 |
| WO | 00/62302 | 10/2000 |

* cited by examiner

Primary Examiner—Lisa Lea-Edmonds
Assistant Examiner—Anthony Q. Edwards
(74) Attorney, Agent, or Firm—Wenderoth, Lind & Ponack, L.L.P.

(57) ABSTRACT

A computer has a casing housing a display, and a frame of the casing borders the display. A cooling passage is provided in the frame and has a cooling fluid therein. The frame itself forms the passage for the cooling fluid. By connecting the passage with the interior of the casing, so as to for example cool electronic components therein, effective cooling of the computer is carried out by distributing the heat through the frame of the display.

25 Claims, 6 Drawing Sheets

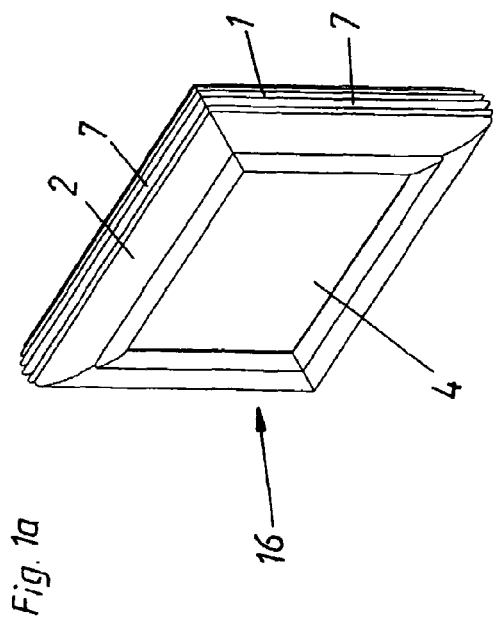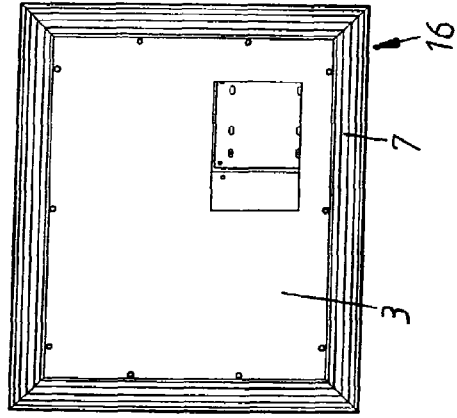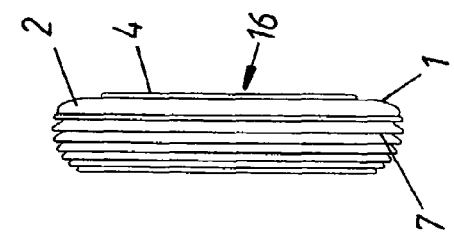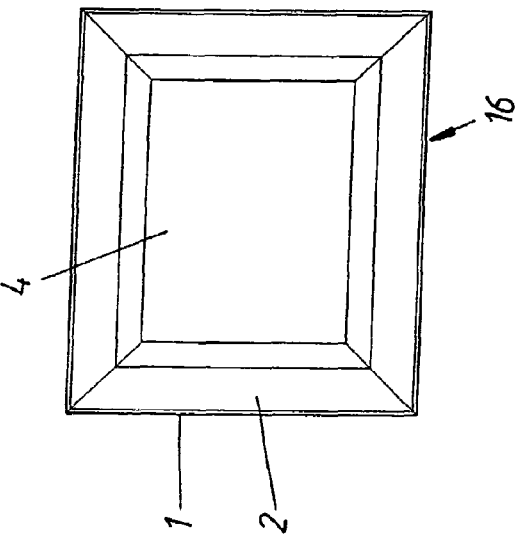

COOLED COMPUTER CASING DISPLAY FRAME

BACKGROUND OF THE INVENTION

The present invention concerns a computer, in particular an industrial computer, comprising a casing having a display which is bordered by a frame.

As computers of that kind are generally used in surroundings with ambient conditions which are detrimental to the operation of electronic components, the sealing integrity of the casing plays an extremely important part. A problem which arises in this connection is that a sealed casing greatly hinders dissipation of the heat which is inevitably produced in operation of electronic components, so that in an extreme situation it can even happen that electronic components are destroyed. As passive heat exchangers in the form of internal and external cooling ribs are frequently inadequate, an active water cooling system is generally used, with a large external cooling body which serves as a heat exchanger. This disadvantageously increases the amount of space for such a computer. In addition, external connections for the supply and discharge of water have to be provided on the computer casing, which always involves the risk of water escaping.

SUMMARY OF THE INVENTION

The object of the invention is to provide an arrangement of the general kind set forth in which the above-discussed problems of the state of the art do not occur.

According to the invention, this is achieved in that disposed in the frame is a passage—preferably extending therearound—for a cooling fluid.

As computers of the general kind set forth are preferably installed in machine installations or control desks in such a way that only the display is exposed, the arrangement according to the invention of the cooling passage in the frame in the proximity of the display ensures that a satisfactory heat exchange between the interior of the casing and the surroundings can take place.

A particularly preferred embodiment of the invention provides that the frame itself forms the passage for the cooling fluid, which represents a particularly advantageous way of implementing the arrangement according to the invention. That is the case in particular when at least the frame and preferably the entire casing is produced from an extrusion. That manner of manufacture permits particularly simple dimensioning of the casing, whereby it is suitable for accommodating displays of the most widely varying sizes. In order to alter the dimensions of the casing according to the invention, in regard to a casing produced using an extrusion process, the desired cut length of the individual parts (preferably four) is simply selected, and those parts are then joined together by an adhesive, for example a two-component adhesive. In that respect, the casing can be produced in one piece, or it is possible to produce only the frame and the side walls adjoining it in one piece. A panel which seals off the computer at its rear side can in the latter case be produced separately and joined to the rest of the casing.

In the case of a frame or casing produced in accordance with the state of the art by a casting process, a suitable casting mould would have to be produced for each desired dimensioning, which involves major costs.

If the passage for the cooling fluid is formed by the frame itself, it is particularly advantageous for the frame to be of a single-walled nature, as that affords an optimum thermal coupling effect between the cooling fluid flowing in the passage and the ambient air around the computer.

A further advantageous embodiment of the invention provides that arranged on the casing are cooling ribs which project outwardly and/or into the interior of the casing. Cooling ribs of that kind improve the heat exchange between the interior of the casing and the area surrounding the computer. The heat exchange effect can be still further improved in an advantageous manner by cooling ribs being arranged at least in a portion-wise manner at the inside of the passage.

A further particularly preferred embodiment of the invention provides that connecting portions which project into the interior of the casing are arranged on the cooling passage. That makes it possible to produce a fluid-conducting communication (for example a hose connection) between the passage arranged in the frame and heat exchangers arranged on the interior of the casing on individual components.

A further advantageous embodiment of the invention provides that just two such connecting portions project from the cooling passage into the interior of the casing, wherein they are preferably arranged at the top side or the underside of the frame, preferably centrally. If a fluid-conducting communication is produced with a heat-generating component on the interior of the casing by way of those two connecting portions, then naturally occurring convection will already provide for a satisfactory circulation of the cooling fluid in the cooling passage without a pump being required to maintain the circulation.

After the cooling fluid has received the heat from the electronic components it rises of its own accord due to its lower density in the direction of the upper connecting portion from where it passes into the cooling passage and continues to flow horizontally along both sides. In doing so it gives off its heat to the area surrounding the industrial computer, which increases its density, so that at the two vertical portions of the cooling passage, under the force of gravity, it passes into the lower horizontal region of the passage. From there it is urged by the fluid flowing thereafter, by way of the lower connecting portion, upwardly again to the heat-generating component, whereby the cooling circuit is closed.

A further advantageous embodiment of the invention provides that the cooling fluid is a liquid, for example water. Preferably distilled water can be used to reduce the formation of deposits in the cooling passage. In that respect it is preferably provided that introduction of the cooling fluid, more especially water, is already effected at the factory upon assembly of the computer casing. Throughout the entire service life of the computer casing according to the invention, in that case, no change in the cooling fluid is intended, so that it is possible to completely eliminate external connecting portions.

In a further advantageous embodiment of the invention it is provided that the display is in the form of a touch display. That makes it advantageously possible to eliminate the provision of a specific keyboard for operating the computer according to the invention.

If a plurality of heat-generating components or a few components involving the generation of a large amount of heat are to be incorporated into the cooling circuit according to the invention, an advantageous embodiment of the invention can provide that at least one pump for circulating the cooling fluid in the cooling circuit is arranged on the interior of the casing. That ensures a satisfactory heat exchange even when a very large amount of heat is developed.

The present invention not only concerns a computer of the general kind stated, but also a casing with or without a rear panel for electronic components, in which no electronic components are yet installed, and a method of cooling electronic components in such a computer or casing, in which the cooling fluid circulating in the frame is passed by way of a fluid-conducting communication into the interior of the casing for cooling at least one electronic component—preferably at least the CPU.

BRIEF DESCRIPTION OF THE DRAWINGS

Further details of the invention can be seen from the specific description hereinafter. In the drawings:

FIGS. 1a, 1b, 1c and 1d show a perspective view, a front view, a side view and a rear view of a computer according to the invention.

DETAILED DESCRIPTION OF THE PREFERRED EMBODIMENTS

Figure 2A:
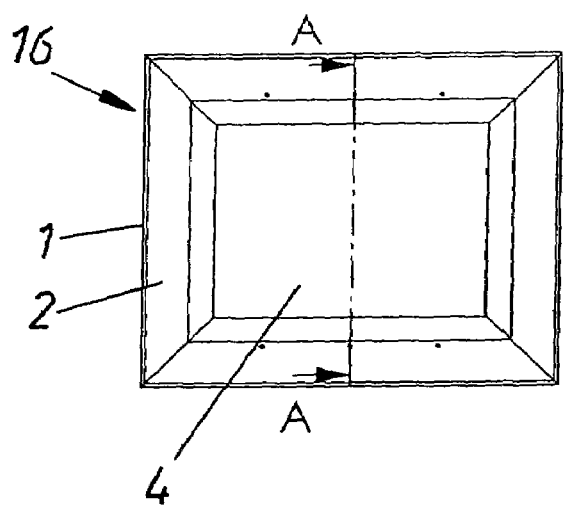
FIG. 2a shows a front view of a computer according to the invention.

FIG. 1a shows a housing 1 according to the invention of an industrial computer 16 with a display 4 which is bordered by a frame 2. FIG. 1b is a front view of the same casing 1. The side view in FIG. 1c very clearly shows cooling ribs 7 according to the invention, which are on the outside of the casing. FIG. 1d shows a rear view looking onto the casing 1 according to the invention, wherein it is possible to see a panel 3 which seals off the casing 1 at the rear side thereof.

Figure 2B:
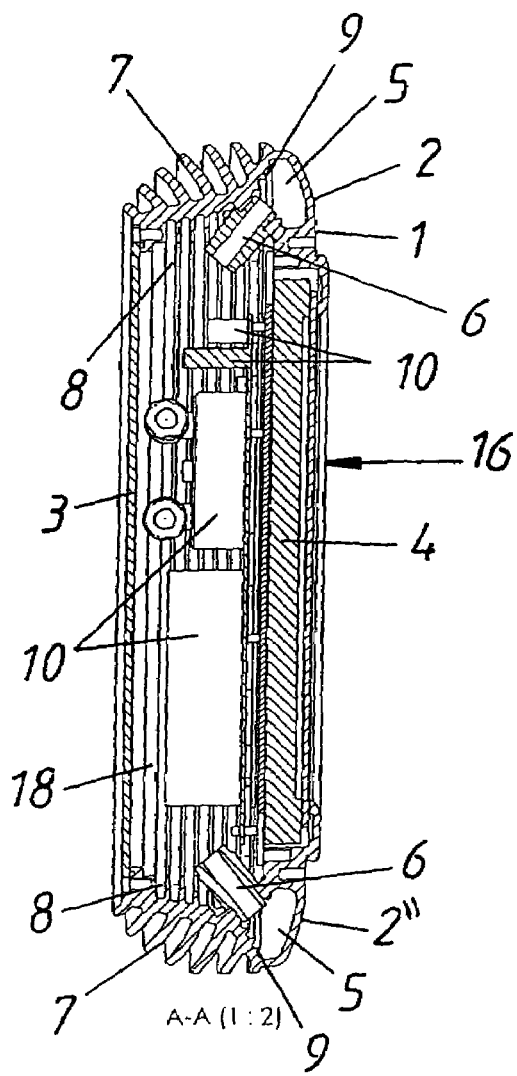
FIG. 2b shows a view in section through a computer according to the invention taken along line A—A in FIG. 2a, FIG. 2c shows a detail view of FIG. 2b.
Figure 2C:
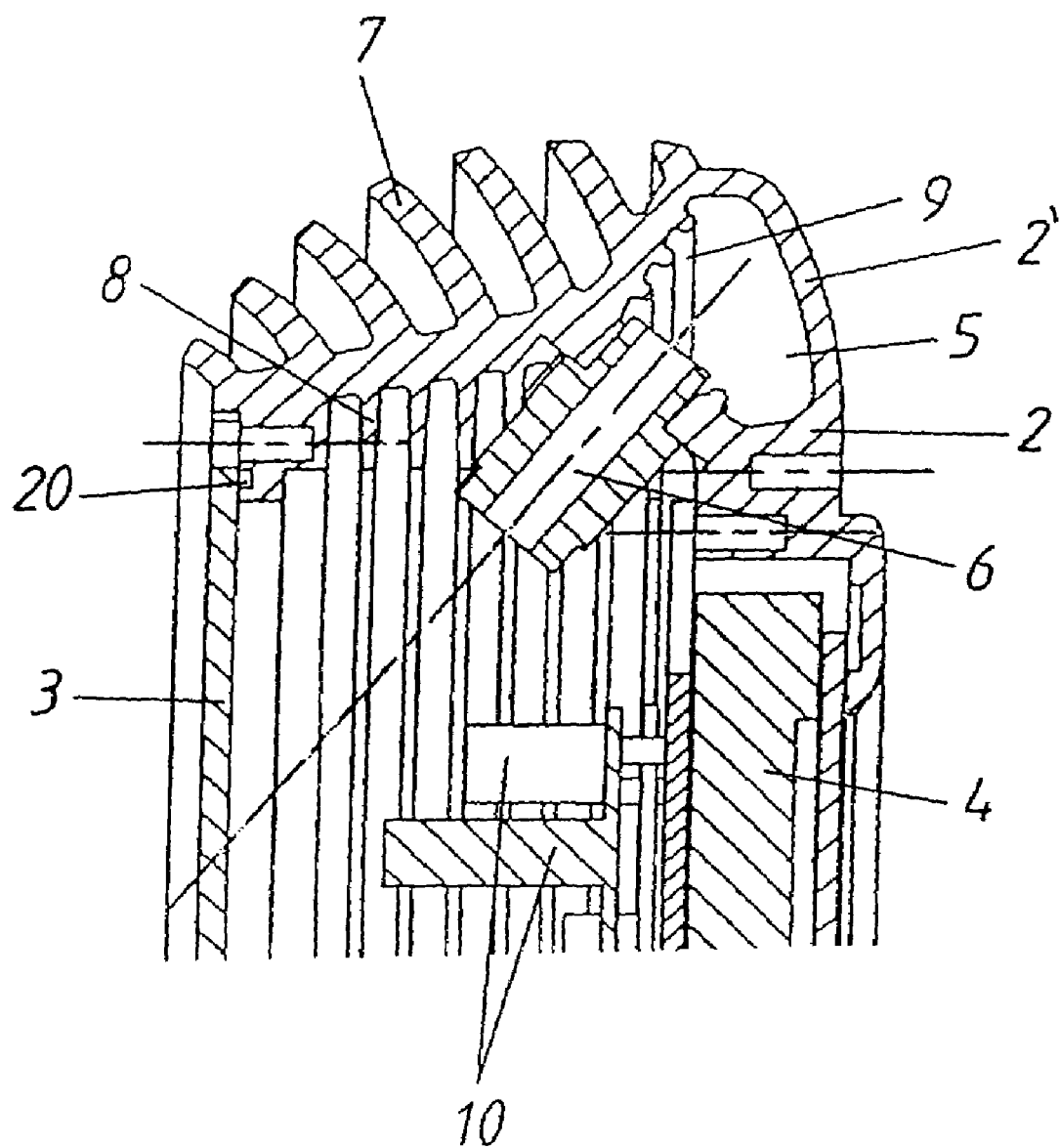

FIG. 2b is a sectional view of the casing 1 according to the invention along line A—A of FIG. 2a. It is possible in particular to clearly see the arrangement according to the invention of a cooling passage 5 in the frame 2 of the casing 1. In this embodiment the cooling passage 5 is formed by the frame 2 itself. In this embodiment the frame 2 and thus the cooling passage 5 are of a single-wall configuration. In the illustrated embodiment the casing 1 is produced by an extrusion process. Cooling ribs 7 on the outside of the casing and cooling ribs 8 on the inside of the casing improve heat exchange with the ambient atmosphere if the industrial computer 16 is not fitted directly into an installation 17 but has a certain lateral clearance. In this embodiment there are two connecting portions 6 for producing a fluid-conducting communication 13 (not shown in this Figure) into the interior 18 of the casing. The arrangement of those connecting portions 6 is advantageously implemented as illustrated, wherein one connecting portion 6 is arranged at a top side 2' of the frame and the other connecting portion 6 is arranged at an underside 2" of the frame, approximately centrally. It is also possible to see diagrammatically illustrated electronic components 10 which are fixed on the interior 18 of the casing in a manner with which the man skilled in the art is familiar. It is also possible to see cooling ribs 9 which are provided at an inward side of the passage 5 and which serve for further improving heat exchange. The rear side of the computer 16 is sealed off by a panel 3, an inserted sealing ring 20 being apparent more especially in FIG. 2c.

Figure 3:
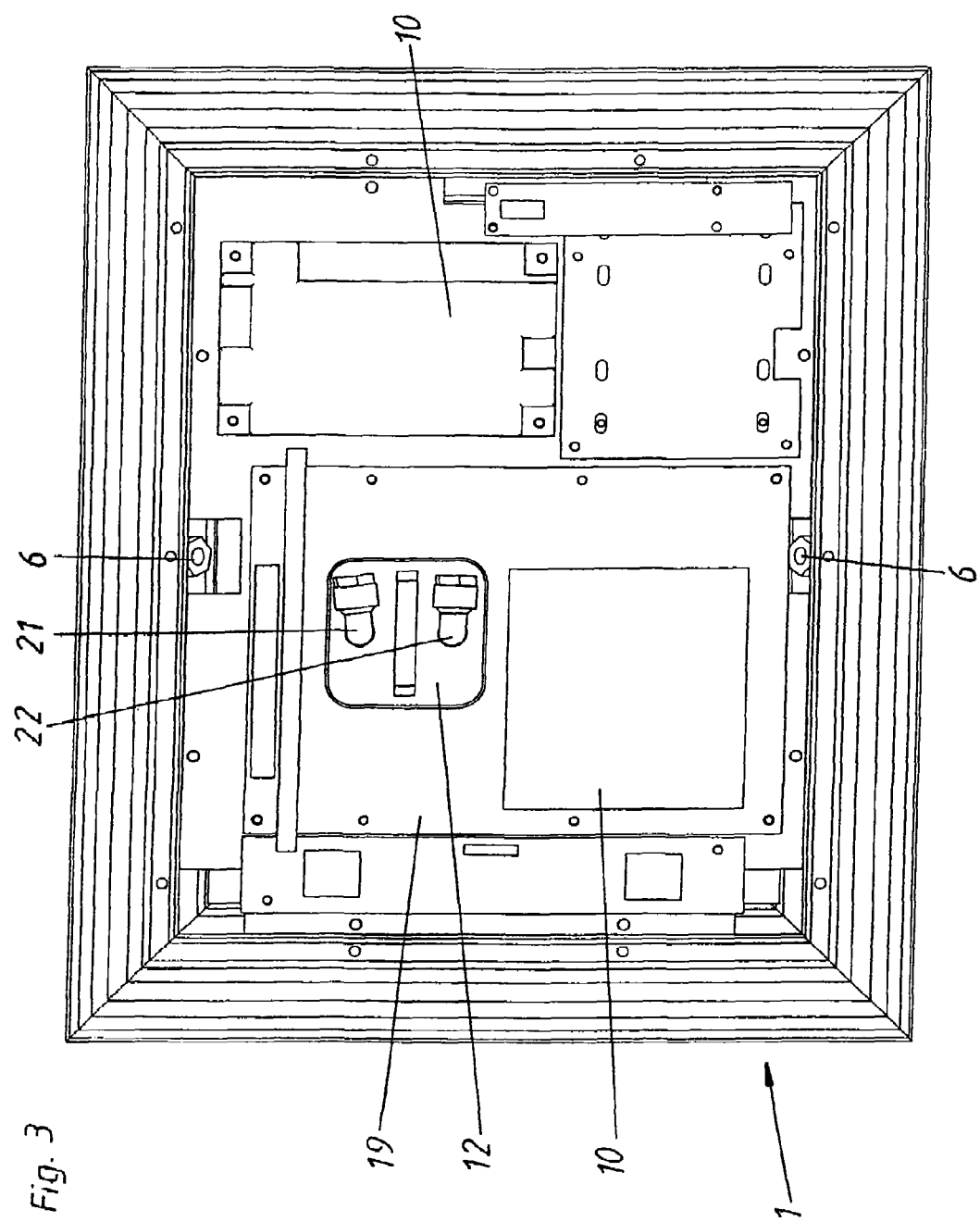
FIG. 3 shows a plan view of a computer casing according to the invention with the rear casing panel removed.

In FIG. 3 the panel 3 at the rear side of the casing has been removed to permit a view into the interior 18 of the casing. It is possible to see the central arrangement of the connecting portions 6 disposed at the top side 2' and the underside 2" of the frame, together with a heat exchanger 12 having two connections 21, 22 which can be connected to the connecting portions 6 by way of a fluid-conducting connection 13 (not shown). It is further possible to see various diagrammatically illustrated electronic components 10, inter alia a motherboard 19.

Figure 4A:
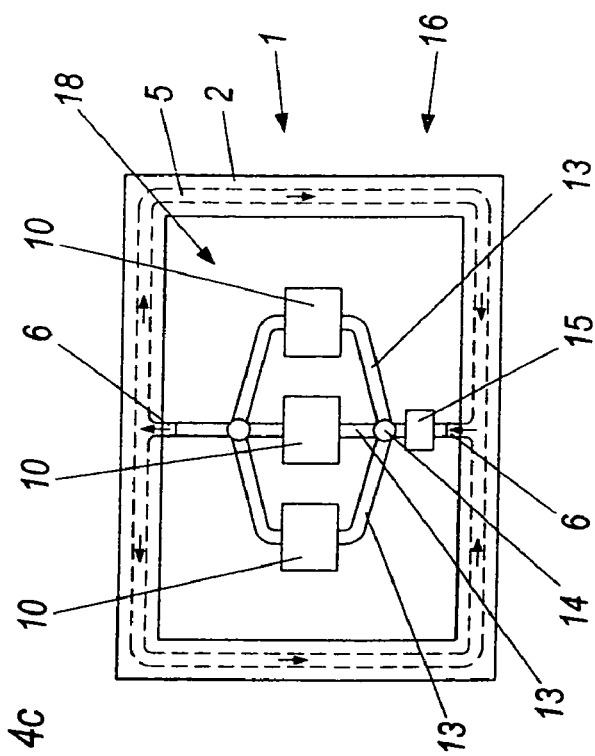
FIG. 4a is a diagrammatic view showing a cooling circuit in a computer according to the invention.

FIG. 4 show once again the mode of operation of the cooling system according to the invention, in various embodiments:

FIG. 4a, which is a diagrammatic view of the rear of an industrial computer 18 according to the invention, shows a cooling circuit in which a heat exchanger 12 is arranged on the interior 18 of the casing over the CPU 11 of the computer 16, through which flows the cooling fluid circulating in the frame. After the cooling fluid has absorbed heat in the heat exchanger 12, which for example is in the form of a hollow copper or aluminium member with two connections, and the cooling fluid has thereby experienced a reduction in its density, it rises against the force of gravity through the hose connection 13, illustrated by way of example, to the connecting portion 6 which is arranged at the top side 2' of the frame, without the support of a pump being necessary for that purpose. After passing into the cooling passage 5 in the region of the top side 2' of the frame, the cooling fluid is involved in a further horizontal movement on both sides along the horizontal top side 2' of the frame, in which case the cooling fluid continuously gives off heat to the surroundings of the computer 16 and in so doing increases its density again. The cooled cooling fluid drops by way of the two vertical regions of the cooling passage 5 to the underside 2" of the frame, from where, due to the fluid urging it onward, it passes by way of the connecting portion 6 arranged at the underside 2" of the frame into the interior 18 of the casing again, into the lower hose conduit 13 and thus to the heat exchanger 12 again. This closes the cooling circuit.

Figure 4B:
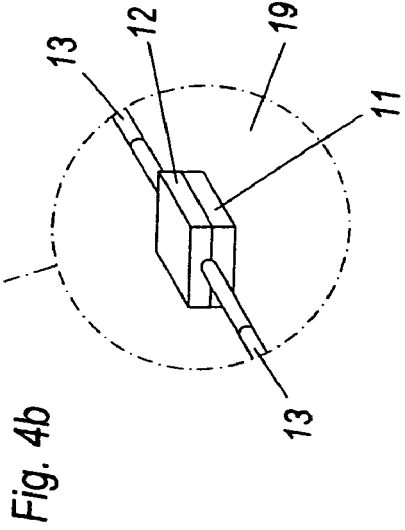
FIG. 4b shows a perspective diagrammatic view of a detail from FIG. 3a, FIG. 4c shows a further diagrammatic view of the cooling circuit in a computer according to the invention when supplying a plurality of electronic components.

FIG. 4b is a diagrammatic view showing in detail the arrangement of the heat exchanger 12 at the top side of the CPU 11 which is arranged on a motherboard 19. It will be appreciated that it is also possible to envisage design configurations of heat exchangers 12 which completely enclose the electronic components and thus provide for improved dissipation of heat.

Figure 4C:
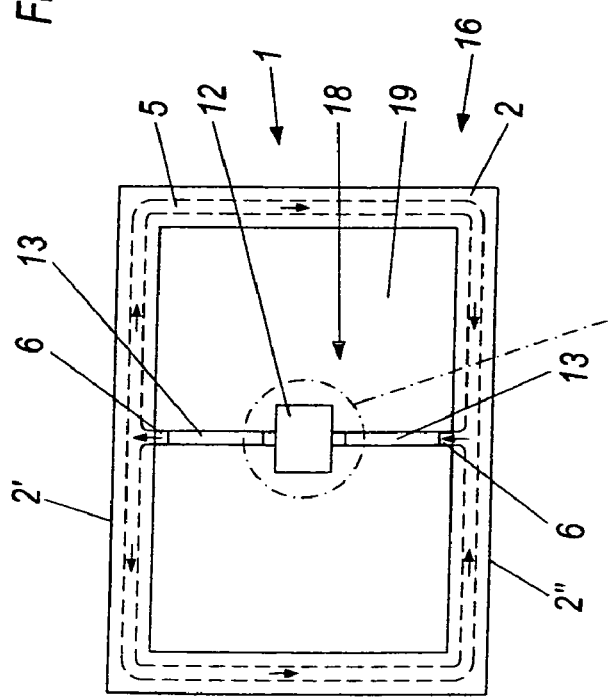
FIG. 4d is a plan view of the cooling circuit in a further embodiment of a computer according to the invention.

FIG. 4c is also a diagrammatic view of a further embodiment of an industrial computer 16 according to the invention, wherein, unlike FIG. 4a, a plurality of diagrammatically illustrated electronic components 10 on the interior 18 of the casing are in fluid-conducting communication by way of hose connections 13 with the two connecting portions 6. Particularly in the case of large installations, it can certainly be provided that a pump 15 is arranged in the interior 18 of the casing to improve the heat exchanger effect. It can be seen from FIG. 4c that, even when supplying a plurality of electronic components 10, two connecting portions 6 may be sufficient if a hose divider 14 is used.

Figure 4D:
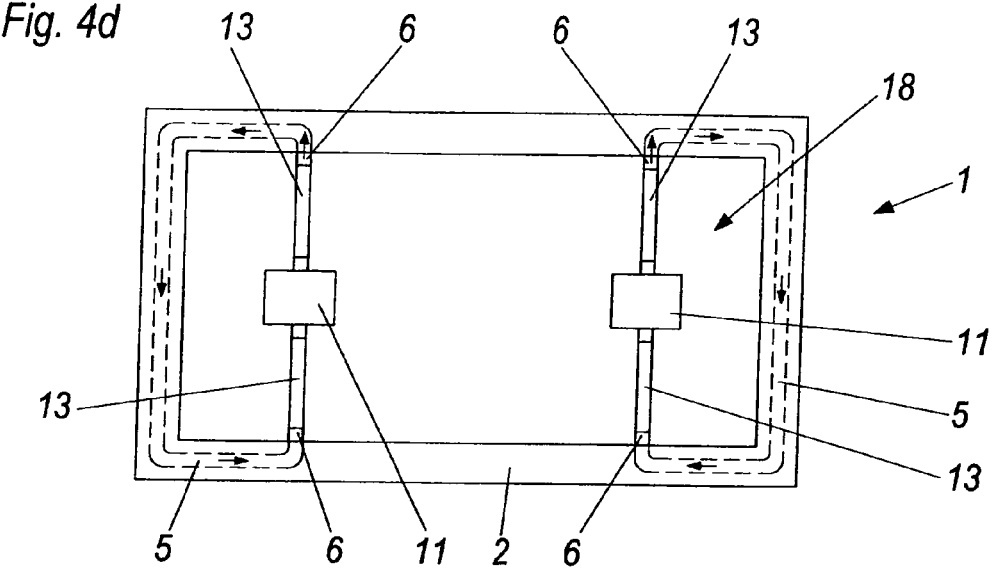

FIG. 4d diagrammatically shows a further embodiment of an industrial computer 16 according to the invention, in which there are two mutually separate cooling circuits for supplying electronic components 10 (in the example illustrated here two CPUs 11). In the illustrated example four connecting portions 6 were provided for the purpose of passing fluid into the interior 18 of the casing.

Figure 5:
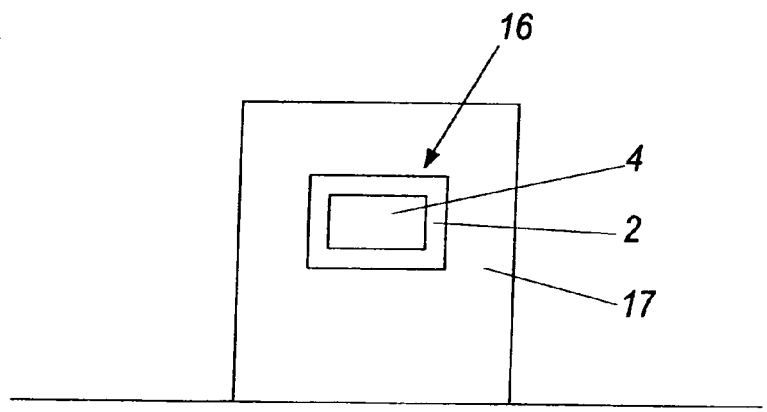
FIG. 5 shows a computer according to the invention in an installed condition.

FIG. 5 diagrammatically shows an industrial computer 16 according to the invention, which was fitted into an installation 17 in such a way that only the frame 2 and the display 4 are in contact with the surroundings. The arrangement of the cooling passage 5 in accordance with the invention means that this is already sufficient for adequate cooling of the electronic components 10 (not shown in FIG. 4) on the interior 18 of the casing of the industrial computer 16 according to the invention.

Details and operating procedures which are familiar to the man skilled in the art have not been described and illustrated in the specific description and the Figures.

The invention claimed is:

1. A computer comprising:
   a casing having a display which is bordered by a frame;
   wherein said frame has a passage arranged therein with a cooling fluid in said passage;
   wherein said frame itself forms said passage for said cooling fluid;
   wherein a fluid-conducting communication is provided between said passage and at least one electronic component; and
   wherein said electronic component is inside of said casing.

2. The computer of claim 1, wherein said passage extends around said frame.

3. The computer of claim 1, wherein said frame is of a single-wall configuration.

4. The computer of claim 1, wherein said frame is made from an extrusion.

5. The computer of claim 4, wherein the entire said casing is made from an extrusion.

6. The computer of claim 1, wherein said casing comprises outwardly projecting cooling ribs.

7. The computer of claim 1, wherein cooling ribs are arranged on said casing that project into the interior of said casing.

8. The computer of claim 1, wherein cooling ribs are arranged on at least part of the inside of said passage.

9. The computer of claim 1, wherein said fluid-conducting communication comprises connecting portions which project into the interior of said casing and are provided on said passage in fluid communication with said passage.

10. The computer of claim 9, wherein said connecting portions are exactly two connecting portions.

11. The computer of claim 10, wherein a respective one of said two connecting portions is arranged at each of a top side and an underside of said frame.

12. The computer of claim 1, wherein said fluid-conducting communication extends between said passage and at least one heat exchanger on the interior of said casing.

13. The computer of claim 12, wherein said fluid-conducting communication comprises a hose connection.

14. The computer of claim 12, wherein said computer comprises a CPU having one of said at least one heat exchanger arranged thereat.

15. The computer of claim 1, and further comprising at least one pump arranged to circulate the cooling fluid in said passage.

16. The computer of claim 1, wherein the cooling fluid is a liquid.

17. The computer of claim 1, wherein the cooling fluid is water.

18. The computer of claim 17, wherein the cooling fluid is distilled water.

19. The computer of claim 1, wherein said display is a touch display.

20. A method of cooling electronic components in the computer according to claim 1, comprising:
   circulating said cooling fluid in said passage of said frame; and
   passing said cooling fluid from said passage through said fluid-conducting communication into the interior of said casing so as to cool said at least one electronic component in said casing.

21. The method of claim 20, wherein said at least one electronic component that is cooled by said passing is a CPU.

22. A computer comprising:
   a display;
   a casing having a plurality of electronic components inside of said casing and a frame surrounding said display;
   a passage in said frame having a cooling fluid therein, said frame itself forming said passage for said cooling fluid; and
   a fluid-conducting communication disposed between said passage and at least one of said electronic components.

23. The computer of claim 22, wherein said display has a viewing side from which said display is intended to be viewed and a non-display side, said plurality of electronic components being disposed on said non-display side of said display.

24. The computer of claim 22, wherein said at least one of said electronic components is a CPU.

25. The computer of claim 22, wherein said fluid-conducting communication communicates said passage with at least two of said electronic components in order to remove heat therefrom.

* * * * *